United States Patent
Kang et al.

(10) Patent No.: US 11,223,046 B2
(45) Date of Patent: Jan. 11, 2022

(54) BINDER COMPOSITION FOR SECONDARY BATTERIES, AND ELECTRODE AND LITHIUM SECONDARY BATTERY INCLUDING THE SAME

(71) Applicant: LG CHEM, LTD., Seoul (KR)

(72) Inventors: Min Ah Kang, Daejeon (KR); Dong Jo Ryu, Daejeon (KR); Cheol Hoon Choi, Daejeon (KR); Seon Hee Han, Daejeon (KR); Hye Soo Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1 day.

(21) Appl. No.: 15/516,820

(22) PCT Filed: Jun. 16, 2016

(86) PCT No.: PCT/KR2016/006395
§ 371 (c)(1),
(2) Date: Apr. 4, 2017

(87) PCT Pub. No.: WO2016/204530
PCT Pub. Date: Dec. 22, 2016

(65) Prior Publication Data
US 2018/0108912 A1 Apr. 19, 2018

(30) Foreign Application Priority Data
Jun. 17, 2015 (KR) .................. 10-2015-0085579

(51) Int. Cl.
| | |
|---|---|
| *H01M 4/62* | (2006.01) |
| *H01M 4/04* | (2006.01) |
| *H01M 4/13* | (2010.01) |
| *C08F 212/08* | (2006.01) |
| *C08F 220/12* | (2006.01) |
| *C08L 33/08* | (2006.01) |
| *H01M 4/131* | (2010.01) |
| *H01M 4/133* | (2010.01) |
| *H01M 10/0525* | (2010.01) |

(52) U.S. Cl.
CPC .......... *H01M 4/622* (2013.01); *C08F 212/08* (2013.01); *C08F 220/12* (2013.01); *C08L 33/08* (2013.01); *H01M 4/0404* (2013.01); *H01M 4/13* (2013.01); *H01M 4/131* (2013.01); *H01M 4/133* (2013.01); *H01M 4/625* (2013.01); *H01M 10/0525* (2013.01); *H01M 2220/20* (2013.01)

(58) Field of Classification Search
CPC .... H01M 4/622; H01M 4/133; H01M 4/0404; H01M 4/131; H01M 10/0525; H01M 4/625; H01M 4/13; H01M 2220/20; C08L 33/08; C08F 220/12; C08F 212/08
USPC .......................................................... 429/66
See application file for complete search history.

(56) References Cited

U.S. PATENT DOCUMENTS

| | | | |
|---|---|---|---|
| 2012/0070737 A1* | 3/2012 | Son ................... | H01M 10/0525 429/217 |
| 2012/0095131 A1 | 4/2012 | Kinoshita et al. | |
| 2012/0264878 A1 | 10/2012 | Matsuyama et al. | |
| 2013/0316235 A1 | 11/2013 | Yasuda et al. | |
| 2015/0017533 A1 | 1/2015 | Takahashi et al. | |
| 2015/0125746 A1* | 5/2015 | Sonobe ................. | H01M 4/133 429/217 |
| 2016/0233512 A1* | 8/2016 | Park ....................... | H01M 4/13 |
| 2017/0081541 A1* | 3/2017 | Makarainen ......... | C08K 5/1545 |
| 2017/0279123 A1* | 9/2017 | Nakayama .............. | H01M 4/62 |

FOREIGN PATENT DOCUMENTS

| | | |
|---|---|---|
| EP | 1244158 A1 | 9/2002 |
| JP | 2010040228 A | 2/2010 |
| KR | 1020080034218 A | 4/2008 |
| KR | 1020110100133 A | 9/2011 |
| KR | 1020120027189 A | 3/2012 |
| KR | 1020140116910 A | 10/2014 |
| KR | 1020150021004 A | 2/2015 |

* cited by examiner

*Primary Examiner* — Christian Roldan
(74) *Attorney, Agent, or Firm* — Dentons US LLP

(57) ABSTRACT

Disclosed is a binder composition for secondary batteries including composite latex comprising conjugated diene latex particles (A) and copolymer latex particles (B), each present in an independent phase, wherein the composite latex has a pH of 7 or less.

14 Claims, No Drawings

BINDER COMPOSITION FOR SECONDARY BATTERIES, AND ELECTRODE AND LITHIUM SECONDARY BATTERY INCLUDING THE SAME

CROSS-REFERENCE TO RELATED APPLICATION

This application is a National Stage Entry of International Application No. PCT/KR2016/006395, filed Jun. 16, 2016, and claims the benefit of Korean Application No. 10-2015-0085579 filed on Jun. 17, 2015, all of which are hereby incorporated by reference in their entirety for all purposes as if fully set forth herein.

TECHNICAL FIELD

The present invention relates to a binder composition for secondary batteries, and an electrode and a lithium secondary battery including the same.

BACKGROUND ART

Recently, technological development and increased demand associated with portable equipment such as portable computers, cellular phones and cameras have brought about an increase in the demand for secondary batteries as energy sources. Among these secondary batteries, lithium secondary batteries having high energy density and operating voltage, long lifespan and low self-discharge rates have been actively researched and are commercially available and widely used.

In general, as lithium ions of a positive electrode are repeatedly intercalated into and de-intercalated from a negative electrode, lithium secondary batteries are charged and discharged. Repeated intercalation and deintercalation of lithium ions causes bonding between electrode active materials and conductive materials to weaken and contact resistance between particles to be increased. As a result, ohmic resistance of electrodes is increased and battery characteristics may thus be deteriorated. Accordingly, a binder is preferably an elastic polymer because it should offset expansion and shrinkage of electrode active materials resulting from intercalation and deintercalation of lithium ions on the electrodes.

In addition, the binder should have adhesivity to maintain binding strength between the electrode active material and the current collector in the process of drying electrode plates. In particular, in order to improve discharge capacity, in the case where natural graphite having a theoretical discharge capacity of 372 mAh/g is used in combination with a material such as silicon, tin or silicon-tin alloys having high discharge capacity, volume expansion of the material considerably increases, in the course of charging and discharging, thus causing separation of the negative electrode material. As a result, battery capacity rapidly decreases over repeated cycling.

Accordingly, there is an increasing demand in the art for binder and electrode materials which can improve structural stability of electrodes and thus performance of batteries even after several hundred cycles by preventing separation between the electrode active materials, or between the electrode active material and the current collector upon fabrication of electrodes via strong adhesion and controlling volume expansion of electrode active materials upon repeated charge/discharge via strong physical properties.

Furthermore, since a binder may act as resistance itself, it should not greatly affect resistance and ionic conductivity. Resistance is an important property of batteries because most medium and large batteries require high power. There is increasing demand for research on binders having low resistance as well.

Accordingly, there is a high need for development of binders having excellent adhesivity and low resistance.

DISCLOSURE

Technical Problem

As described above, preferably, binders are elastic, maintain capacity after charge/discharge cycles due to excellent adhesivity and adhesion maintenance in secondary batteries and increase battery power due to low resistance.

Accordingly, as a result of a variety of extensive and intensive studies and experiments, the inventors of the present application found that, when mixing conjugated diene latex particles with acrylic copolymer latex particles in a predetermined ratio and preparing a binder composition such that the final latex has a pH of 7 or less, adhesivity of the binder composition can be improved and when applying the binder composition to lithium secondary batteries, resistance of lithium secondary batteries can be reduced and capacity maintenance thereof can be excellent. As a result, the present invention has been completed.

Technical Solution

In accordance with one aspect of the present invention, provided is a binder composition for secondary batteries which includes composite latex including conjugated diene latex particles (A) and copolymer latex particles (B) each present in an independent phase wherein the composite latex has a pH of 7 or less.

Specifically, the composite latex particularly has a pH of 3 to 7, more particularly 3 to 6.5. In addition, pH of the composite latex depends on the latex particles (A) and latex particles (B) constituting the composite latex. Here, the latex particles (A) and latex particles (B) may also have pH of 3 to 7, particularly, 3 to 6.5.

When pH is lower than 3 which is not within the range defined above, it is greatly different from the pH of the negative electrode slurry, thus disadvantageously causing agglomeration during addition of the binder, and when pH is higher than 7, disadvantageously, two binders may agglomerate or adhesivity may be deteriorated, although not.

Meanwhile, the composite latex may have an average particle diameter of 100 nm to 700 nm. When the average particle diameter is less than 100 nm, adhesivity may be deteriorated and when the average particle diameter is higher than 700 nm, resistance may be increased.

Hereinafter, components of the composite latex will be described in detail.

The acrylic copolymer latex particles (B) have a high electrolyte swelling index, thus reducing resistance of electrodes and improving ionic conductivity. When the acrylic copolymer latex particles (B) are included in the binder composition, performance required for lithium secondary batteries can be improved.

The acrylic copolymer latex particles (B) include monomers having excellent affinity to carbonate-based electrolytes. Accordingly, when batteries are stored at high temperature, electrolyte swelling is facilitated, so that the electrolyte decomposes or side-reactions occur, thus disadvantageously increasing the thickness of the electrode and inducing deintercalation of the electrode.

Accordingly, in order to maximize the effects of the present invention, the binder composition according to the present invention may particularly include 1 to 50% by weight of the conjugated diene latex particles (A), based on the total solid weight.

When the conjugated diene latex particles (A) are included in the binder composition, a binder, which has less electrolyte swelling at high temperature and has rubber elasticity, functions to reduce the electrode thickness and gas generation, and to improve adhesivity to maintain binding strength between the electrode active material and the current collector.

When the conjugated diene latex particles (A) exceed 50% by weight, based on the solid weight, the conjugated diene latex particles act as resistance. For this reason, the conjugated diene latex particles are preferably contained within the range defined above.

The conjugated diene latex particles (A) may include a polymer of one or more monomers selected from the group consisting of: (a) a conjugated diene monomer or a conjugated diene polymer; (b) one or more monomers selected from the group consisting of acrylate, vinyl, (meth)acrylamide and nitrile monomers; (c) an unsaturated carboxylic acid monomer; and (d) a hydroxyl group-containing monomer, more particularly, they may include a polymer of one or more monomers selected from the group consisting of: (a) a conjugated diene monomer or a conjugated diene polymer; (b) one or more monomers selected from the group consisting of acrylate, vinyl, (meth)acrylamide and nitrile monomers; and (c) an unsaturated carboxylic acid monomer, and (d) a hydroxyl group-containing monomer. That is, the conjugated diene latex particles (A) may indispensably include (d) the hydroxyl group-containing monomer.

The conjugated diene monomer may be selected from the group consisting of 1,3-butadiene, isoprene, chloroprene and piperidine.

The conjugated diene polymer is, for example, a polymer of two or more monomers selected from the group consisting of 1,3-butadiene, isoprene, chloroprene and piperidine, a styrene-butadiene copolymer, an acrylonitrile-butadiene copolymer, a styrene-isoprene copolymer, an acrylate-butadiene rubber, an acrylonitrile-butadiene-styrene rubber, an ethylene-propylene-diene-based polymer, a partially hydrogenated, epoxidized or brominated form of these polymers, or a mixture thereof.

The acrylic copolymer latex particles (B) may include a polymer of one or more monomers selected from the group consisting of: (a) a (meth)acrylic acid ester monomer; (b) one or more monomers selected from the group consisting of acrylate, vinyl, (meth)acrylamide and nitrile monomers; (c) an unsaturated carboxylic acid monomer; and (d) a hydroxyl group-containing monomer, more particularly, a polymer of one or more monomers selected from the group consisting of: (a) a (meth)acrylic acid ester monomer; (b) one or more monomers selected from the group consisting of acrylate, vinyl, (meth)acrylamide and nitrile monomers; and (c) an unsaturated carboxylic acid monomer, and (d) a hydroxyl group-containing monomer. That is, the conjugated diene latex particles (B) may indispensably include (d) the hydroxyl group-containing monomer.

The (meth)acrylic acid ester monomer may include one or more monomers selected from the group consisting of methylacrylate, ethylacrylate, propylacrylate, isopropylacrylate, n-butylacrylate, isobutylacrylate, n-amylacrylate, isoamylacrylate, n-ethylhexylacrylate, 2-ethylhexylacrylate, methylmethacrylate, ethylmethacrylate, propylmethacrylate, isopropylmethacrylate, n-butylmethacrylate, isobutylmethacrylate, n-amylmethacrylate, isoamylmethacrylate, n-hexylmethacrylate, n-ethylhexyl methacrylate, 2-ethylhexyl methacrylate lauryl acrylate, ceryl acrylate, stearyl acrylate, lauryl methacrylate, cetyl methacrylate and stearyl methacrylate monomers.

The acrylate monomer may include one or more monomers selected from the group consisting of methacryloxy ethylethyleneurea, β-carboxy ethylacrylate, aliphatic monoacrylate, dipropylene diacrylate, ditrimethylopropane tetraacrylate, dipentaerythritol hexaacrylate, pentaerythritol triacrylate, pentaerythritol tetraacrylate, and glycidyl methacrylate.

The vinyl monomer may include one or more monomers selected from the group consisting of styrene, α-methylstyrene, β-methylstyrene, p-t-butylstyrene and divinylbenzene.

The (meth)acrylamide monomer may include one or more monomers selected from the group consisting of acrylamide, n-methylol acrylamide, n-butoxy methacrylamide, methacrylamide, n-methylol methacrylamide, and n-butoxy methyl methacrylamide.

The nitrile monomer may be alkenyl cyanide, particularly, acrylonitrile, methacrylonitrile, allyl cyanide or the like.

The unsaturated carboxylic acid monomer may include one or more monomers selected from the group consisting of maleic acid, fumaric acid, methacrylic acid, acrylic acid, glutaric acid, itaconic acid, tetrahydrophthalic acid, crotonic acid, isocrotonic acid and nadic acid.

The hydroxyl group-containing monomer may include one or more monomers selected from the group consisting of hydroxyethyl acrylate, hydroxybutyl acrylate, hydroxypropyl acrylate, hydroxyethyl methacrylate, hydroxypropyl methacrylate, and hydroxy butyl methacrylate.

The preparation methods of the conjugated latex particles (A) and the acrylic copolymer latex particles (B) are not particularly limited and the conjugated latex particles (A) and acrylic copolymer latex particles (B) can be prepared by well-known suspension polymerization, emulsion polymerization, seed polymerization or the like. The monomer mixture for preparing latex particles may include one or more other ingredients such as a polymerization initiator, a crosslinking agent, a coupling agent, a buffer, a molecular weight regulator and an emulsifier.

Specifically, the latex particles (A) and latex particles (B) can be prepared by emulsion polymerization. In this case, the average particle diameters of the latex particles (A) and latex particles (B) can be controlled by the amount of emulsifier. In general, as the amount of emulsifier increases, the size of particles decreases and when the amount of emulsifier decreases, the size of particles increases. The desired average particle diameter can be obtained by controlling the amount of emulsifier used in consideration of desired particle size, reaction time, reaction stability and the like.

The polymerization temperature and polymerization time can be suitably determined depending on polymerization method, polymerization initiator and the like. For example, the polymerization temperature may be 50° C. to 300° C. and the polymerization time may be 1 to 20 hours.

The polymerization initiator may be an inorganic or organic peroxide, for example, a water-soluble initiator including potassium persulfate, sodium persulfate, ammonium persulfate and the like, or an oil-soluble initiator including cumene hydroperoxide, benzoyl peroxide and the like. In addition, in order to facilitate initiation reaction of peroxide, an activator as well as the polymerization initiator may be further included. The activator may include at least one selected from the group consisting of sodium formaldehyde sulfoxylate, sodium ethylenediaminetetraacetate, ferrous sulfate and dextrose.

The crosslinking agent is a material for facilitating crosslinking of the binder and examples thereof include amines such as diethylene triamine, triethylene tetramine, diethylamino propylamine, xylene diamine and isophorone diamine, acid anhydrides such as dodecyl succinic anhydride and phthalic anhydride, polyamide resins, polysulfide resins, phenolic resins, ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, trimethylol methane triacrylate, glycidyl methacrylate and the like. The grafting agent may be aryl methacrylate (AMA), triaryl isocyanurate (TAIC), triaryl amine (TAA), diaryl amine (DAA) or the like.

The coupling agent is a material for increasing adhesive strength between an active material and a binder, and is characterized by having two or more functional groups. Any material may be used without particular limitation so long as it has one functional group that reacts with a hydroxyl or carboxyl group on a surface of a silicon, tin or graphite-based active material to form a chemical bond and the other group that reacts with nano-composites according to the present invention to form a chemical bond. For example, the coupling agent may be a silane-based coupling agent such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane, cyanatopropyl trimethoxysilane, or the like.

The buffer may for example include one or more selected from the group consisting of $NaHCO_3$, NaOH, and $NH_4OH$.

For example, the molecular weight regulator may be mercaptan, terpene such as terpinolene, dipentene or t-terpinene, halogenated hydrocarbon such as chloroform and carbon tetrachloride or the like.

The emulsifier has both a hydrophilic group and a hydrophobic group. In a specific embodiment, the emulsifier may include one or more selected from the group consisting of anionic emulsifiers and nonionic emulsifiers.

When a nonionic emulsifier is used with an anionic emulsifier, particle size and particle distribution may be more easily controlled. In addition, electrostatic stabilization of an ionic emulsifier may be provided and colloid-type stabilization of polymer particles through van der Waals forces may be further provided. Nonionic emulsifiers are not often used alone since particles that are less stable than in anionic emulsifiers are generated.

The anionic emulsifier may be selected from the group consisting of phosphates, carboxylates, sulfates, succinates, sulfosuccinates, sulfonates and disulfonates. For example, the anionic emulsifier may be selected from the group consisting of sodium alkyl sulfate, sodium polyoxyethylene sulfate, sodium lauryl ether sulfate, sodium polyoxyethylene lauryl ether sulfate, sodium lauryl sulfate, sodium alkyl sulfonate, sodium alkyl ether sulfonate, sodium alkylbenzene sulfonate, sodium linear alkylbenzene sulfonate, sodium alpha-olefin sulfonate, sodium alcohol polyoxyethylene ether sulfonate, sodium dioctyl sulfosuccinate, sodium perfluorooctane sulfonate, sodium perfluorobutane sulfonate, alkyldiphenyloxide disulfonate, sodium dioctyl sulfosuccinate (DOSS), sodium alkyl-aryl phosphate, sodium alkyl ether phosphate, sodium lauroyl sarcosinate, but the present invention is not limited thereto and all well-known anionic emulsifiers may be incorporated in the present invention.

The nonionic emulsifier may be an ester-, an ether-, an ester-ether type or the like. For example, the nonionic emulsifier may be polyoxyethylene glycol, polyoxyethylene glycol methyl ether, polyoxyethylene monoallyl ether, polyoxyethylene bisphenol-A ether, polypropylene glycol, polyoxyethylene neopentyl ether, polyoxyethylene cetyl ether, polyoxyethylene lauryl ether, polyoxyethyl oleyl ether, polyoxyethylene stearyl ether, polyoxyethylene decyl ether, polyoxyethylene octyl ether, or the like, but the present invention is not limited thereto and all well-known nonionic emulsifiers may be incorporated in the present invention.

The conjugated latex particles (A) prepared as described above include 10 to 97.4% by weight of (a) the conjugated diene monomer or conjugated diene polymer, 1 to 70% by weight of (b) the monomer of the group, 1 to 20% by weight of (c) the unsaturated carboxylic acid monomer, and 0.5 to 5% by weight of (d) the hydroxyl group-containing monomer, based on the total weight of the latex particles (A). Other ingredients such as the emulsifier, buffer and crosslinking agent may be optionally present in an amount of 0.1 to 10% by weight.

Similarly, the acrylic copolymer latex particles (B) prepared as described above include 10 to 96.9% by weight of (a) the (meth)acrylic acid ester monomer, 1 to 60% by weight of (b) the monomer of the group, 1 to 10% by weight of (c) the unsaturated carboxylic acid monomer, and 1 to 10% by weight of (d) the hydroxyl group-containing monomer, based on the total weight of the latex particles (B). Other ingredients such as the emulsifier, buffer and crosslinking agent may be optionally present in an amount of 0.1 to 10% by weight.

Meanwhile, when latex particles (A) and latex particles (B) are present as independent phases in the binder composition according to the present invention, adhesivity can be further improved. Accordingly, it is very important to prevent agglomeration between particles.

In a specific embodiment, by controlling pH of latex particles (A) and latex particles (B) respectively prepared, the particles (A, B) can maintain their independent phases, not agglomerating.

Accordingly, as described above, by adjusting pH of latex particles (A) and latex particles (B) according to the present invention to 3 to 7, when mixing two latex particles at low pH, latex particles can maintain independent phases, rather than agglomerating.

According to the present invention, the binder composition may further include, in addition to the latex particles, an antioxidant and a preservative. In particular, when the conjugated diene latex particles (A) are included in the binder composition, deterioration of properties such as softening or gelation during battery operation may be easily induced and thus lifespan of a battery may be shortened. Accordingly, an antioxidant is preferably used to decrease such deterioration.

In addition, the binder composition may further include one or more selected from the group consisting of a viscosity controller and a filler. Hereinafter, the viscosity controller and the filler will be described below in more detail.

Meanwhile, in a specific embodiment, the binder composition according to the present invention having a configuration described above may have a swelling index with regard to electrolyte of 1.5 to 5.

The swelling index with regard to electrolyte is a parameter indicating how much the binder composition swells after absorbing the electrolyte. The composition may have volume swelling (%), with respect to the electrolyte, that is, a percentage of expansion volume to original volume, of 50% to 400%, and thus have the value given above. The swelling index with regard to electrolyte can be calculated by the following formula:

*Swelling index:(volume after swelling upon electrolyte contact)/(volume before swelling=original volume)

In addition, the present invention provides an electrode mix for secondary batteries including the aforementioned binder composition and an electrode active material capable of intercalating and de-intercalating lithium. The electrode mix for secondary batteries may preferably further include a conductive material. The conductive material will be described in detail in the following.

The electrode active material is preferably a lithium transition metal oxide powder or a carbon powder. Accordingly, the present invention provides an electrode for secondary batteries in which the electrode mix is applied to a current collector. The electrode may be fabricated by applying the electrode mix to a current collector, followed by drying and pressing. The electrode for secondary batteries may be a positive electrode or a negative electrode.

For example, the positive electrode is fabricated by applying a mixture consisting of a positive electrode active material, a conductive material and a binder to a positive electrode current collector, followed by drying. The negative electrode is fabricated by applying a mixture consisting of a negative electrode active material, a conductive material and a binder to a negative electrode current collector, followed by drying. In some cases, the negative electrode may include no conductive material.

The positive electrode active material is lithium transition metal oxide which includes two or more transition metals, and examples thereof include, but are not limited to, layered compounds such as lithium cobalt oxide ($LiCoO_2$) or lithium nickel oxide ($LiNiO_2$) substituted by one or more transition metals; lithium manganese oxide substituted by one or more transition metals; lithium nickel oxide represented by the formula of $LiNi_{1-y}M_yO_2$ (in which M=Co, Mn, Al, Cu, Fe, Mg, B, Cr, Zn or Ga and includes one or more elements among the elements, $0.01 \leq y \leq 0.7$); lithium nickel cobalt manganese composite oxides represented by $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d < 0.2$, $0 \leq e \leq 0.2$, b+c+d<1, M=Al, Mg, Cr, Ti, Si or Y, A=F, P or Cl); and olivine lithium metal phosphate represented by the formula of $Li_{1+x}M_{1-y}M'_yPO_{4-z}X_z$ (in which M=transition metal, preferably Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

Examples of the negative electrode active material include carbon and graphite materials such as natural graphite, artificial graphite, expanded graphite, carbon fiber, incompletely-graphitized carbon, carbon black, carbon nanotubes, perylene and activated carbon; metals alloyable with lithium, such as Al, Si, Sn, Ag, Bi, Mg, Zn, In, Ge, Pb, Pd, Pt and Ti, and compounds containing these elements; composites of carbon and graphite materials with metals and compounds thereof; and lithium-containing nitrides. Thereamong, a carbon-based active material, a silicon-based active material, a tin-based active material, or a silicon-carbon-based active material is more preferred. These materials may be used alone or in combination of two or more thereof.

The conductive material serves to further improve conductivity of the electrode active material and is commonly added in an amount of 0.01 to 30% by weight, based on the total weight of the electrode mix. Any conductive material may be used without particular limitation so long as it has suitable conductivity without causing adverse chemical changes in the fabricated secondary battery.

Examples of the conductive material include: graphite such as natural or artificial graphite; carbon blacks such as carbon black, acetylene black, Ketjen black, channel black, furnace black, lamp black and thermal black; carbon derivatives such as carbon nanotubes or fullerene; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and conductive materials such as polyphenylene derivatives.

The current collector in the electrode is a component where electrons move during electrochemical reaction of the active material and is divided into a positive electrode current collector and a negative electrode current collector depending on the type of electrode.

The positive electrode current collector is generally fabricated to a thickness of 3 to 500 μm. There is no particular limit as to the positive electrode current collector, so long as it has excellent conductivity without causing adverse chemical changes in the fabricated battery. Examples of the positive electrode current collector include stainless steel, aluminum, nickel, titanium, sintered carbon, and aluminum or stainless steel surface-treated with carbon, nickel, titanium, silver or the like.

The negative electrode current collector is generally fabricated to a thickness of 3 to 500 μm. There is no particular limit as to the negative electrode current collector, so long as it has suitable conductivity without causing adverse chemical changes in the fabricated battery. Examples of the negative electrode current collector include copper, stainless steel, aluminum, nickel, titanium, sintered carbon, and copper or stainless steel surface-treated with carbon, nickel, titanium, silver, or the like, and aluminum-cadmium alloys.

These current collectors include fine irregularities on the surface thereof so as to enhance adhesion to electrode active materials. In addition, the current collectors may be used in various forms including films, sheets, foils, nets, porous structures, foams and non-woven fabrics.

The mixture (electrode mix) consisting of an electrode active material, a conductive material, a binder and the like may further include at least one material selected from the group consisting of a viscosity controller and a filler.

The viscosity controller controls the viscosity of the electrode mix so as to facilitate mixing of the electrode mix and application thereof to the current collector and may be added in an amount of 30% by weight or less, based on the total weight of the electrode mix. Examples of the viscosity controller include, but are not limited to, carboxymethylcellulose, polyacrylic acid and the like.

The filler is a component used to inhibit expansion of the electrode. There is no particular limit as to the filler, so long as it does not cause adverse chemical changes in the fabricated battery and is a fibrous material. Examples of the filler include olefin polymers such as polyethylene and polypropylene; and fibrous materials such as glass fibers and carbon fibers.

The present invention also provides a lithium secondary battery including the electrode.

The lithium secondary battery generally further includes a separator and a lithium salt-containing non-aqueous electrolyte, in addition to the electrode.

The separator is interposed between the positive electrode and the negative electrode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may serve as both the separator and the electrolyte.

The lithium salt-containing, non-aqueous electrolyte is composed of a non-aqueous electrolyte and a lithium salt.

Examples of the non-aqueous electrolyte include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material that is readily soluble in the above-mentioned non-aqueous electrolyte and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate and imides.

An organic solid electrolyte or an inorganic solid electrolyte may be used, if necessary.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides, sulfates and the like, of lithium such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH and Li$_3$PO$_4$—Li$_2$S—SiS$_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may further include carbon dioxide gas and may further include fluoro-ethylene carbonate (FEC), propene sultone (PRS) or the like.

The secondary batteries according to the present invention may be used for battery cells used as power sources of small devices and may be used as unit batteries of medium or large battery modules including a plurality of battery cells used as power sources of medium or large devices.

Preferably, examples of the medium or large devices include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooters); electric golf carts, energy storage systems and the like.

BEST MODE

Now, the present invention will be described in more detail with reference to examples, comparative examples and test examples. These examples should not be construed as limiting the scope of the present invention.

Example 1

<1-1 Preparation of Latex Particles (A1)>

1,3-butadiene (45 g), styrene (50 g), acrylic acid (3 g) and hydroxyethyl acrylate (2 g) as monomers, NaHCO$_3$ (0.4 g) and sodium lauryl sulfate (0.4 g) as buffers, and dodecyl mercaptan (0.5 g) as a molecular weight regulator were fed batchwise. After these ingredients were mixed and heated to 80° C., potassium persulfate was added as a polymerization initiator to initiate reaction, and reaction was proceeded for 6 hours while maintaining 80° C. to obtain butadiene latex particles (A1). The polymerized latex particles had a pH of 4.5. The average particle diameter is controlled by the amount of emulsifier. In general, as the amount of emulsifier increases, the size of particles decreases. Accordingly, particles can be used by controlling the amount of emulsifier in consideration of desired size, reaction time, reaction stability and the like.

<1-2 Preparation of Latex Particles (B1)>

Butyl acrylate (70 g), styrene (20 g), acrylic acid (5 g), and hydroxy butylacrylate (5 g) as monomers, NaHCO$_3$ (0.4 g) as a buffer, and sodium lauryl sulfate (0.4 g) as an emulsifier were mixed and heated to 75° C. and potassium persulfate was added as a polymerization initiator to initiate reaction. Reaction was proceeded for 6 hours while maintaining 75° C. to obtain latex particles (B1). The latex particles had a pH of 3.5.

<1-3 Preparation of Binder Composition>

The latex particles (A1) and latex particles (B1) of the obtained binder were mixed in a ratio of 40:60, based on the solid weight to prepare a binder composition containing composite latex. The composite latex had a pH of about 4. After mixing, the residue was screened through a 200 mesh sieve and checked. As a result, it was confirmed that agglomeration did not occur.

<1-4 Production of Electrode Slurry and Electrode>

For a negative electrode, water was used as a dispersion medium, and artificial graphite (95.5 g), acetylene black (1 g), the prepared binder for secondary batteries (2.5 g), and carboxymethylcellulose (1 g) as a thickening agent, based on 100 g of the total solid weight, were mixed, to prepare a slurry for negative electrodes such that the total solid content reached 48% by weight. The slurry was applied to a thickness of 200 micrometers to a copper foil, dried under vacuum and pressed to produce a negative electrode.

For a positive electrode, N-methyl-2-pyrrolidone (NMP) was used as a dispersion medium, LiCoO$_2$ (96 g) as an active material, acetylene black (2 g) and a PVDF binder (2 g) were mixed to prepare a slurry. The slurry was applied to a thickness of 250 micrometers to aluminum foil, dried and pressed to produce a positive electrode.

<1-5 Fabrication of Lithium Secondary Battery>

A hole with a surface area of 13.33 cm² was made in the produced negative electrode plate and a hole with a surface area of 12.60 cm² was made on the positive electrode plate to produce a mono-cell. The tap was adhered to the top of the positive electrode and to the top of the negative electrode, a separator composed of a polyolefin microporous membrane was interposed between the negative electrode and the positive electrode, the resulting product was loaded on an aluminum pouch and 500 mg of an electrolyte was injected into the pouch. To prepare the electrolyte, a solvent of ethyl carbonate (EC):diethyl carbonate (DEC):ethyl-methyl carbonate (EMC) mixed in a volume ratio of 4:3:3 was used and $LiPF_6$ as an electrolyte was dissolved in a concentration of 1 M in the solvent. Subsequently, the pouch was sealed using a vacuum packaging machine and stood for 12 hours at room temperature. Subsequently, constant-current charging was performed under approximately 0.05C conditions and then constant-voltage charge was performed so as to maintain voltage until it reached approximately 1/16 of the current. In this regard, since gases are generated inside the cell, degassing and resealing were performed. As a result, a lithium secondary battery was completed.

Example 2

A lithium secondary battery was produced in the same manner as in Example 1, except that a binder composition was prepared by mixing latex particles (A1) with latex particles (B1) in a ratio of 30:70, on a solid weight basis. The composite latex had a pH of about 3.8.

Example 3

A lithium secondary battery was produced in the same manner as in Example 1, except that a binder composition was prepared by mixing latex particles (A1) with latex particles (B1) in a ratio of 20:80, on a solid weight basis. The composite latex had a pH of about 3.7.

Example 4

A lithium secondary battery was produced in the same manner as in Example 1, except that the pH of latex particles (B1) was adjusted to 4.5. The composite latex had a pH of about 4.5.

Example 5

A lithium secondary battery was produced in the same manner as in Example 1, except that a binder composition was prepared by mixing latex particles (A1) with latex particles (B1) in a ratio of 80:20, on a solid weight basis. The composite latex had a pH of about 4.1.

Example 6

A lithium secondary battery was produced in the same manner as in Example 1, except that a binder composition was prepared by mixing latex particles (A1) with latex particles (B1) in a ratio of 90:10, on a solid weight basis. The composite latex had a pH of about 4.2.

Comparative Example 1

A lithium secondary battery was produced in the same manner as in Example 1, except that only latex particles (A1) were added alone to the binder composition.

Comparative Example 2

A lithium secondary battery was produced in the same manner as in Example 1, except that only latex particles (B1) were added alone to the binder composition.

Comparative Example 3

A lithium secondary battery was produced in the same manner as in EXAMPLE 3, except that the pH of latex particles (B1) was adjusted to 8. The composite latex had a pH of about 7.3.

Test Example 1

<Battery Test>

A charge/discharge test of each of the batteries manufactured according to Examples 1 to 6 and Comparative Examples 1 to 3 was carried out. First, a charge/discharge test was carried out twice at a charge/discharge current density of 0.2C, a charge terminal voltage of 4.2 V (Li/Li+), and a discharge terminal voltage of 3 V (Li/Li+). Subsequently, another charge/discharge test was carried out 100 times at a charge/discharge current density of 1 C, a charge terminal voltage of 4.2 V (Li/Li+) and a discharge terminal voltage of 3 V (Li/Li+). All charging was carried out at a constant current/constant voltage and a terminal current of constant voltage charge was 0.05C. After completing the test of a total of 102 cycles, a charge capacity at the $102^{th}$ cycle was divided by a charge capacity at the third cycle to obtain a capacity ratio ($102^{th}/3^{rd}$) The obtained capacity ratio was regarded as a capacity retention ratio of 100 cycles. Results are summarized in Table 1 below.

Test Example 2

<Battery Test>

Charging was conducted to 50% of a discharge capacity at a charge/discharge current density of 0.2C, discharging was conducted at a high current of 5 C for 30 seconds, and DC-IR resistance was measured. Results are shown in the following Table 1.

TABLE 1

| | Presence of agglomeration | 100 cycle capacity retention ratio (%) | Resistance (Ω) |
| --- | --- | --- | --- |
| Example 1 | Non-agglomeration | 91 | 1.3 |
| Example 2 | Non-agglomeration | 90 | 1.3 |
| Example 3 | Non-agglomeration | 90 | 1.2 |
| Example 4 | Non-agglomeration | 91 | 1.3 |
| Example 5 | Non-agglomeration | 90 | 1.6 |
| Example 6 | Non-agglomeration | 89 | 1.6 |
| Comparative Example 1 | Non-agglomeration | 90 | 2.0 |
| Comparative Example 2 | Non-agglomeration | 81 | 1.3 |
| Comparative Example 3 | Agglomeration | — | — |

As can be seen from Table 1, in Comparative Example 3, electrode test could not be conducted due to agglomeration.

Except Comparative Example 2, binders of Examples 1 to 6 exhibited similar capacity retention ratios to the binder of Comparative Example 1. However, as compared to the binder of Comparative Example 1, the binders of Examples 1 to 6 exhibited low resistance, while Comparative Example 2 exhibited low resistance, but considerably deteriorated capacity retention ratio, as compared to other binders.

That is, the conditions according to the present invention should be satisfied in order to acquire excellent capacity retention ratio and low resistance.

Meanwhile, comparing the examples, the binders of Examples 1 to 4 including 50% by weight or less of latex particles (A1), based on the total solid weight, exhibited superior resistance characteristics, as compared to the binders of Examples 5 and 6 including over 50% by weight of latex particles (A1).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the fore-going, when the binder composition according to the present invention is applied to an electrode mix and a lithium secondary battery, excellent bonding strength between electrode materials which undergo volume change upon charge/discharge and between electrode materials and current collectors can be maintained, capacity retention ratio is excellent, and resistance and ionic conductivity of the electrode are improved. As a result, batteries with excellent power characteristics can be effectively provided.

The invention claimed is:

1. A binder composition for secondary batteries comprising a composite latex comprising conjugated diene latex particles (A) and copolymer latex particles (B), each present in an independent phase,
   wherein the conjugated diene latex particles (A) comprise a polymer of:
   (a) a conjugated diene monomer or a conjugated diene polymer, and one or more monomers selected from the group consisting of:
   (b) one or more monomers selected from the group consisting of acrylate, vinyl, (meth)acrylamide and nitrile monomers;
   (c) an unsaturated carboxylic acid monomer; and
   (d) a hydroxyl group-containing monomer;
   wherein the copolymer latex particles (B) comprise a polymer of:
   (a) a (meth)acrylic acid ester monomer, and one or more monomers selected from the group consisting of:
   (b) one or more monomers selected from the group consisting of acrylate, vinyl, (meth)acrylamide and nitrile monomers;
   (c) an unsaturated carboxylic acid monomer; and
   (d) a hydroxyl group-containing monomer;
   wherein, based on a total weight of the conjugated latex particles (A), (a) the conjugated diene monomer or conjugated diene polymer is present in an amount of 10 to 97.4% by weight, (b) the monomer of the group is present in an amount of 1 to 70% by weight, (c) the unsaturated carboxylic acid monomer is present in an amount of 1 to 20% by weight and (d) the hydroxyl group-containing monomer is present in an amount of 0.5 to 5% by weight;
   wherein, based on a total weight of the acrylic copolymer latex particles (B), (a) the (meth)acrylic acid ester monomer is present in an amount of 10 to 96.9% by weight, (b) the monomer of the group is present in an amount of 1 to 60% by weight, (c) the unsaturated carboxylic acid monomer is present in an amount of 1 to 10% by weight, and (d) the hydroxyl group-containing monomer is present in an amount of 1 to 10% by weight;
   wherein the conjugated diene latex particles (A) has a pH of 3 to 6.5;
   wherein the acrylic copolymer latex particles (B) has a pH of 3 to 6.5;
   wherein the composite latex has a pH of 3 to 6.5; and
   wherein the conjugated diene latex particles (A) and the copolymer latex particles (B) are present in the composite latex in a weight ratio of 20:80 to 40:60.

2. The binder composition according to claim 1, wherein the conjugated diene monomer is selected from the group consisting of 1,3-butadiene, isoprene, chloroprene and piperidine, and the conjugated diene polymer is a polymer of two or more monomers selected from the group consisting of 1,3-butadiene, isoprene, chloroprene and piperidine, a styrene-butadiene copolymer, an acrylonitrile-butadiene copolymer, a styrene-isoprene copolymer, an acrylate-butadiene rubber, an acrylonitrile-butadiene-styrene rubber, an ethylene-propylene-diene-based polymer, a partially hydrogenated, epoxidized or brominated form of these polymers, and a mixture thereof.

3. The binder composition according to claim 1, wherein the (meth)acrylic acid ester monomer comprises one or more monomers selected from the group consisting of methylacrylate, ethylacrylate, propylacrylate, isopropylacrylate, n-butylacrylate, isobutylacrylate, n-amylacrylate, isoamylacrylate, n-ethylhexylacrylate, 2-ethylhexylacrylate, methylmethacrylate, ethylmethacrylate, propylmethacrylate, isopropylmethacrylate, n-butylmethacrylate, isobutylmethacrylate, n-amyl methacrylate, isoamylmethacrylate, n-hexylmethacrylate, n-ethylhexyl methacrylate, 2-ethylhexyl methacrylate lauryl acrylate, ceryl acrylate, stearyl acrylate, lauryl methacrylate, cetyl methacrylate, and stearyl methacrylate.

4. The binder composition according to claim 1, wherein the acrylate monomer comprises one or more monomers selected from the group consisting of methacryloxy ethylethyleneurea, β-carboxy ethylacrylate, aliphatic monoacrylate, dipropylene diacrylate, ditrimethylopropane tetraacrylate, dipentaerythritol hexaacrylate, pentaerythritol triacrylate, pentaerythritol tetraacrylate, and glycidyl methacrylate.

5. The binder composition according to claim 1, wherein the vinyl monomer comprises one or more monomers selected from the group consisting of styrene, α-methylstyrene, β-methylstyrene, p-t-butylstyrene and divinylbenzene.

6. The binder composition according to claim 1, wherein the (meth)acrylamide monomer comprises one or more monomers selected from the group consisting of acrylamide, n-methylol acrylamide, n-butoxy methacrylamide, methacrylamide, n-methylol methacrylamide, and n-butoxy methylmethacrylamide.

7. The binder composition according to claim 1, wherein the nitrile monomer is alkenyl cyanide.

8. The binder composition according to claim 7, wherein the alkenyl cyanide comprises one or more monomers selected from the group consisting of acrylonitrile, methacrylonitrile and allyl cyanide.

9. The binder composition according to claim 1, wherein the unsaturated carboxylic acid monomer comprises one or more monomers selected from the group consisting of maleic acid, fumaric acid, methacrylic acid, acrylic acid, glutaric acid, itaconic acid, tetrahydrophthalic acid, crotonic acid, isocrotonic acid and nadic acid.

10. The binder composition according to claim 1, wherein the hydroxyl group-containing monomer comprises one or more monomers selected from the group consisting of hydroxyethyl acrylate, hydroxybutyl acrylate, hydroxypropyl acrylate, hydroxyethyl methacrylate, hydroxypropyl methacrylate, and hydroxy butyl methacrylate.

11. The binder composition according to claim 1, wherein the binder composition has a swelling index with respect to an electrolyte of 1.5 to 5.

12. An electrode mix for secondary batteries comprising:
    the binder composition according to claim 1; and
    an electrode active material capable of intercalating and de-intercalating lithium.

13. An electrode for secondary batteries comprising the electrode mix according to claim 12 applied to a current collector.

14. A lithium secondary battery comprising the electrode for secondary batteries according to claim 13.

* * * * *